United States Patent [19]
Suzuki

[11] Patent Number: 5,715,088
[45] Date of Patent: Feb. 3, 1998

[54] ZOOM LENS SYSTEM WITH FUNCTION OF REDUCING IMAGE VIBRATION

[75] Inventor: Kenzaburo Suzuki, Tokyo, Japan

[73] Assignee: Nikon Corporation, Tokyo, Japan

[21] Appl. No.: 459,314

[22] Filed: Jun. 2, 1995

Related U.S. Application Data

[63] Continuation-in-part of Ser. No. 268,506, Jun. 2, 1995, abandoned.

[30] Foreign Application Priority Data

Jul. 12, 1993 [JP] Japan .................................... 5-195161

[51] Int. Cl.⁶ .............................. G02B 27/64; G02B 15/14
[52] U.S. Cl. ........................... 359/557; 359/554; 359/676; 359/690
[58] Field of Search ........................... 359/554–557, 359/676, 677, 683, 689, 738–740, 690

[56] References Cited

U.S. PATENT DOCUMENTS

| | | | |
|---|---|---|---|
| 4,815,829 | 3/1989 | Yamanashi et al. | 359/690 |
| 4,836,662 | 6/1989 | Ogata et al. | 359/690 |
| 4,907,868 | 3/1990 | Kitagishi et al. | 359/557 |
| 4,974,350 | 12/1990 | Yamazaki et al. | 359/357 |
| 4,978,205 | 12/1990 | Sato | 359/557 |
| 5,000,549 | 3/1991 | Yamazaki | 359/557 |

*Primary Examiner*—Thong Nguyen
*Attorney, Agent, or Firm*—Shapiro and Shapiro

[57] ABSTRACT

A zoom lens system with a function of reducing image vibration is constituted of, in the order from an object side, a first lens group having a positive refracting power; a second lens group being provided so as to be shiftable substantially in a direction perpendicular to an optical axis and having a negative refracting power; and a third lens group having a positive refracting power. When varying the focal length of the zoom lens system from wide angle end to telephoto end, the first and third lens groups are moved on the optical axis toward the object side. The zoom lens system further has a vibration detecting device for detecting vibration of the zoom lens system; a drive device for driving the second lens group; and a control device for controlling the drive device based on the output of the vibration detecting device.

19 Claims, 13 Drawing Sheets

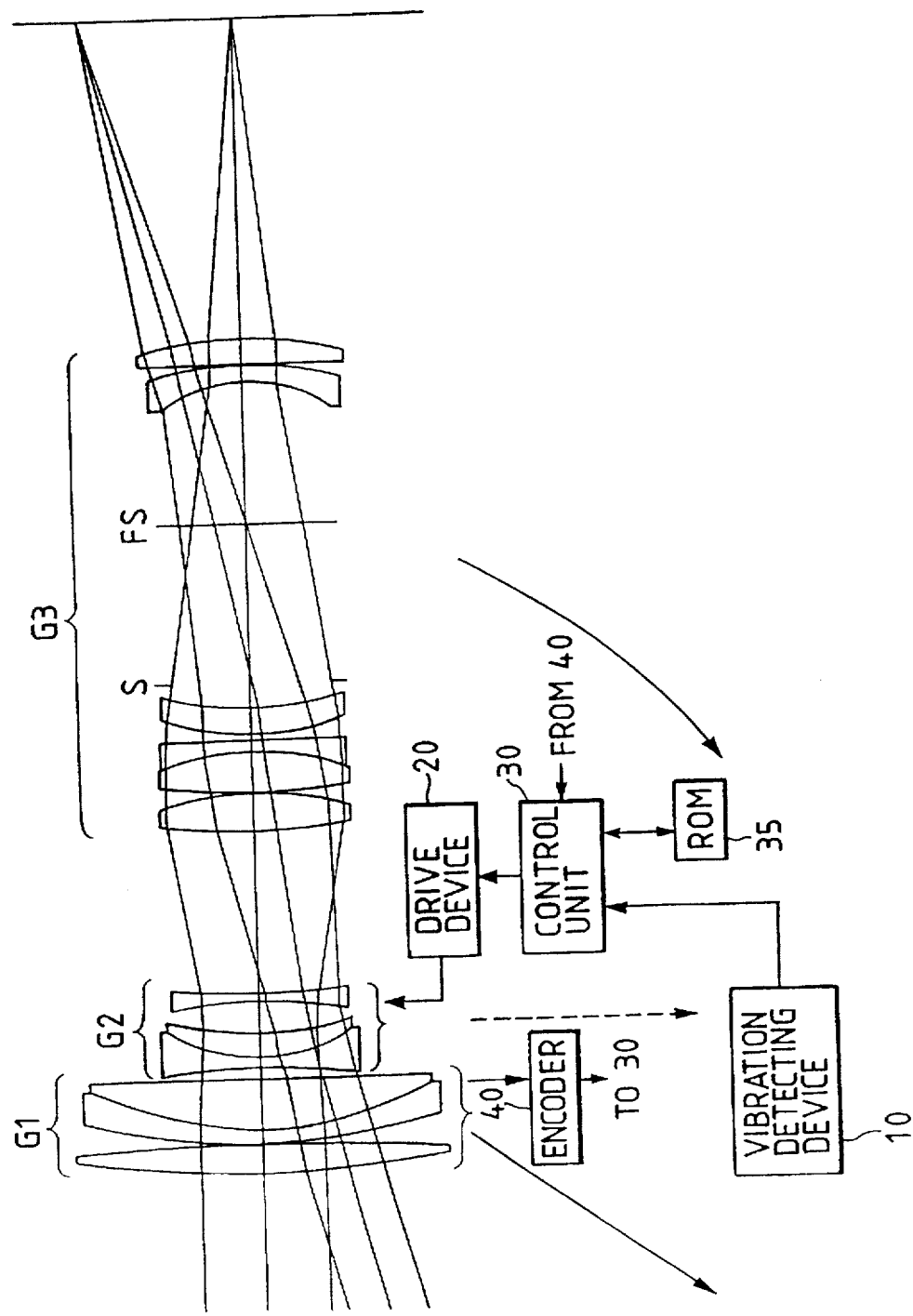

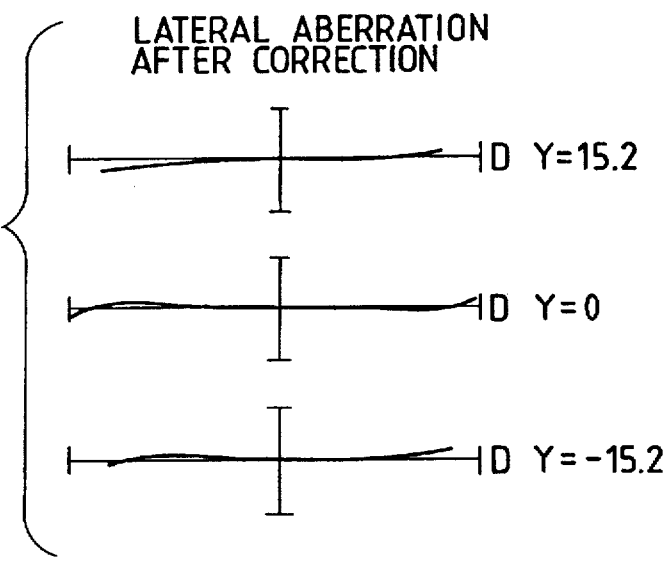
FIG. 2C LATERAL ABERRATION AFTER CORRECTION
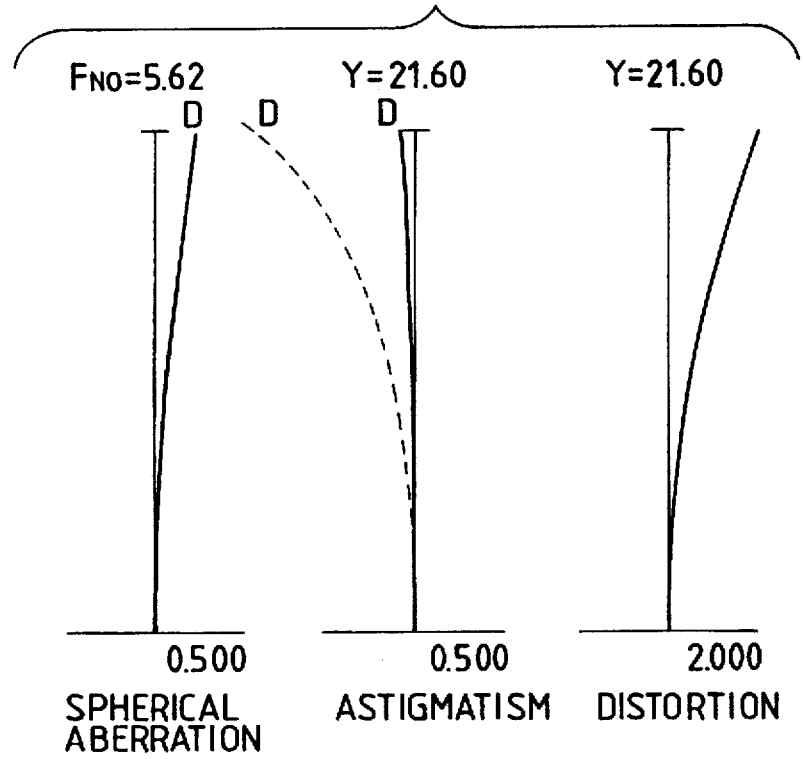
FIG. 2D

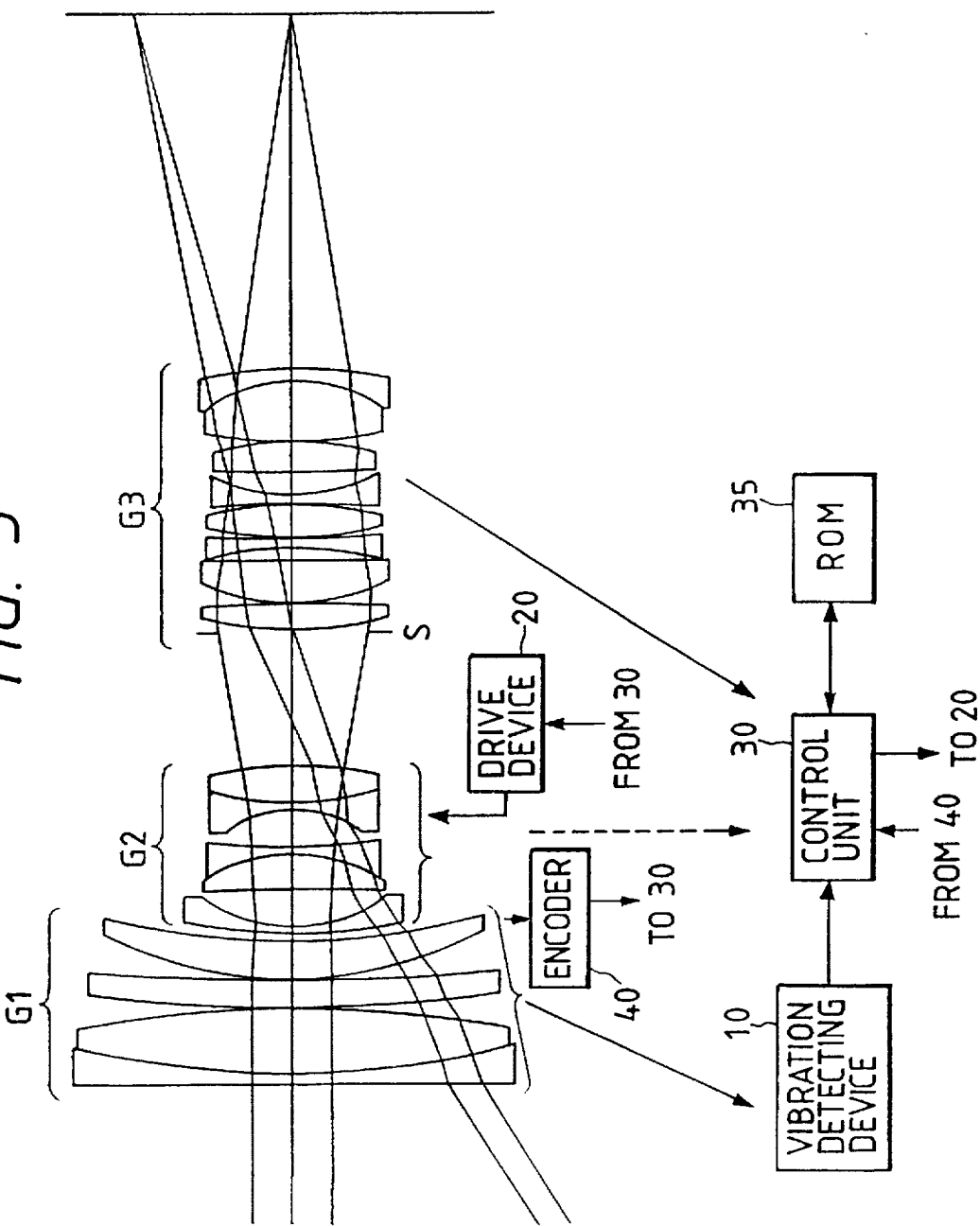

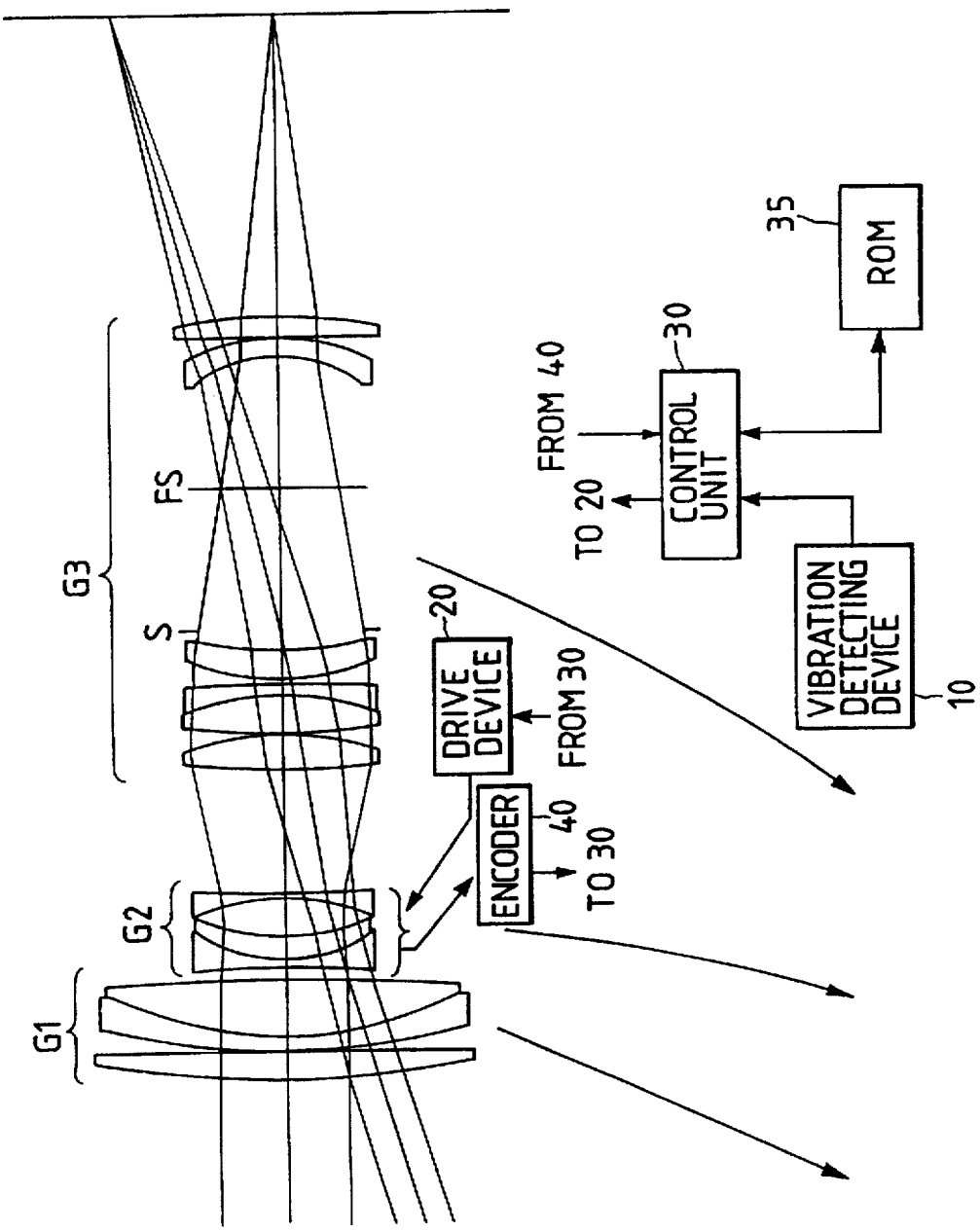

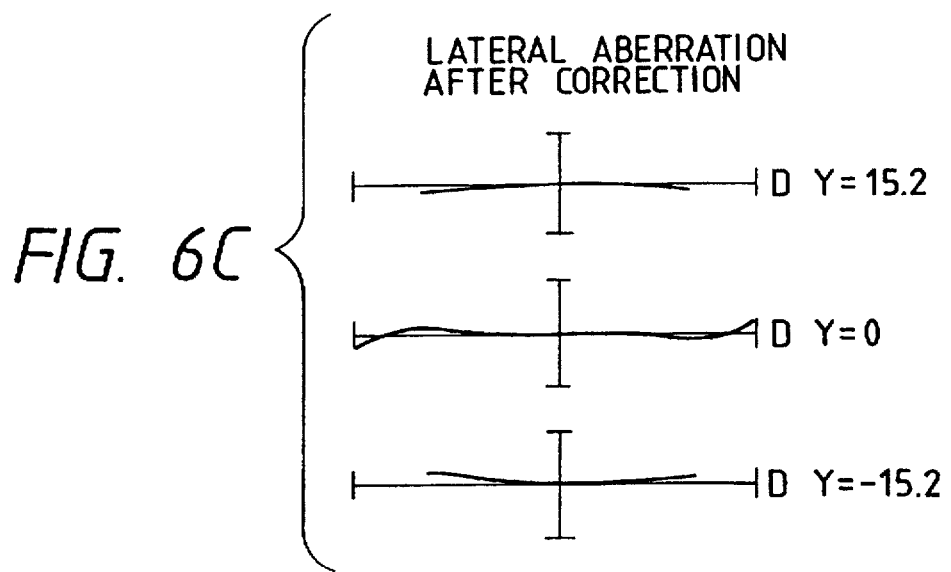
FIG. 6C LATERAL ABERRATION AFTER CORRECTION
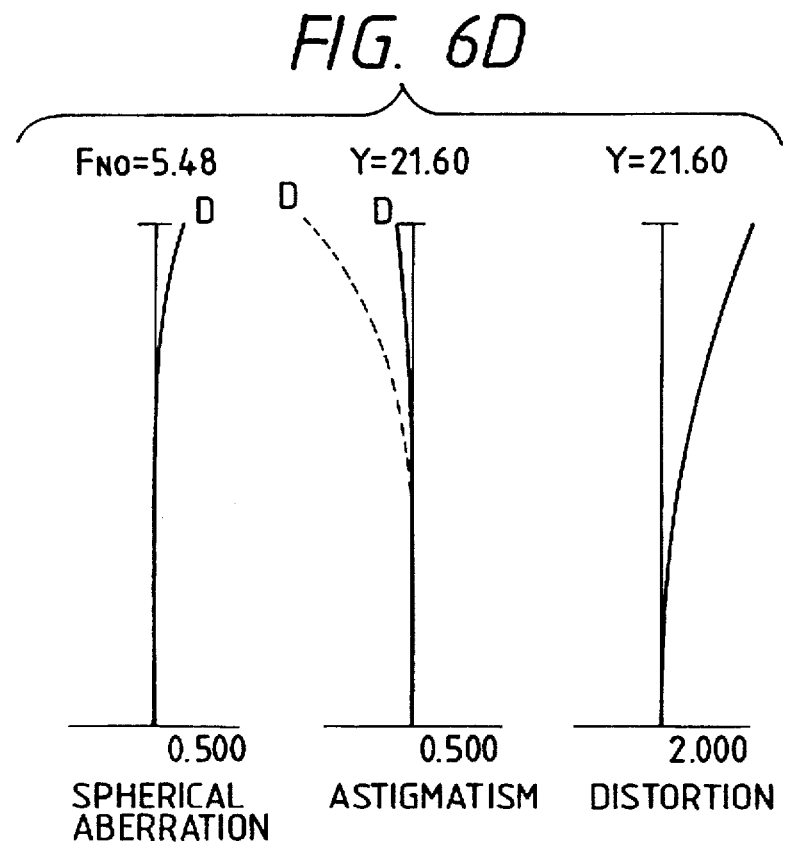
FIG. 6D

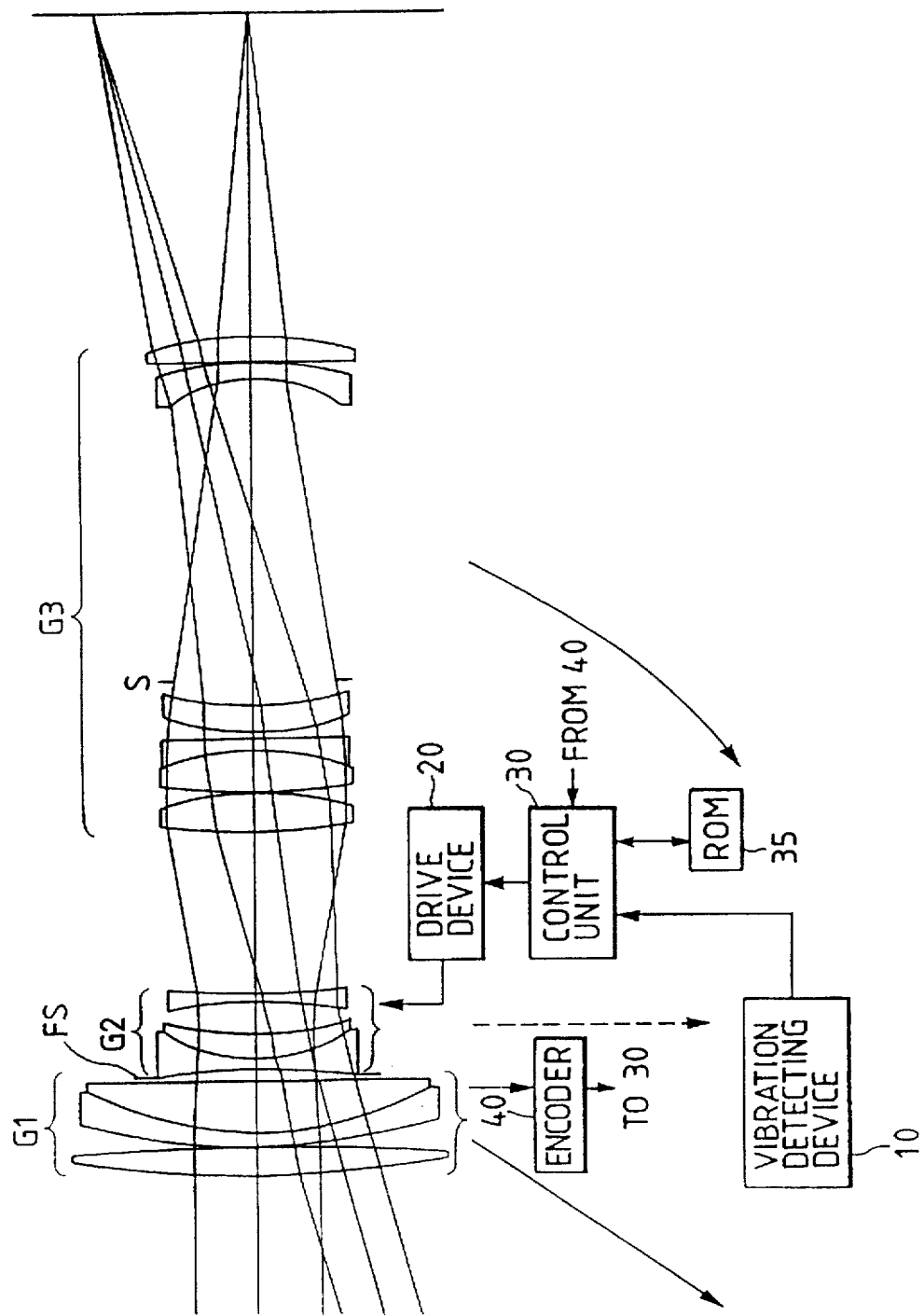

ZOOM LENS SYSTEM WITH FUNCTION OF REDUCING IMAGE VIBRATION

This application is a continuation-in-part of application Ser. No. 08/268,506 filed Jun. 2, 1995 (abandoned).

BACKGROUND OF THE INVENTION

1. Field of the Invention

The present invention relates to a zoom lens system provided with a function of reducing image vibration.

2. Related Background Art

Conventional zoom lenses which are constituted of two or more lens groups and have a function of reducing image vibration have been proposed in Japanese Patent Laid-Open Application Nos. 1-189621, 1-191113 and 1-284823. In the zoom lenses disclosed in Japanese Patent Laid-Open Application Nos. 1-189621 and 1-191113, a first lens group or a fourth lens group is shifted in the direction traversing an optical axis to correct an image condition. In the zoom lens disclosed in Japanese Patent Laid-Open Application No. 1-284823, some lenses of a first lens group which is fixed at the time of varying a focal length of the zoom lens are shifted in the direction traversing an optical axis to correct an image condition.

The above zoom lenses have been proposed on the supposition that they are used in only small cameras such as a so-called compact camera or the like. Therefore, there are the following inconveniences in utilizing them in a so-called single-lens reflex camera.

First, when utilized in a single-lens reflex camera, a generally required back focus cannot be secured sufficiently.

Further, in the above conventional zoom lenses, a large zoom ratio cannot be obtained. Therefore, it is impossible to form a zoom lens having a zoom ratio identical to those of zoom lenses sold as interchangeable lenses for single-lens reflex cameras.

SUMMARY OF THE INVENTION

It is an object of the present invention to provide a high performance zoom lens in which miniaturization is achieved in spite of having a function of reducing image vibration.

It is another object of the present invention to provide a zoom lens capable of securing a predetermined back focus and a predetermined zoom ratio.

In order to achieve the above objects, a zoom lens system with a function of reducing image vibration according to an embodiment of the present invention comprises in the order from an object side:

a first lens group having a positive refracting power;

a second lens group being provided so as to be shiftable substantially along a direction perpendicular to an optical axis and having a negative refracting power; and a third lens group having a positive refracting power, wherein the first and third lens groups are moved toward the object side on the optical axis at the time of varying a focal length of the zoom lens system from the wide angle end to telephoto end, and the zoom lens system further comprising:

a vibration detecting device for detecting vibration of the zoom lens system;

a drive device for driving the second lens group; and a control device for controlling the drive device, based on an output of the vibration detecting device, so as to satisfy the following condition:

$$\Delta Y = (1-\beta_2)\cdot\beta_3\cdot\Delta S,$$

wherein $\Delta Y$: the shift amount of an image corresponding to movement of the second lens group, $\Delta S$: the shift amount of the second lens group for reducing image vibration, $\beta_2$: the magnification of the second lens group, $\beta_3$: the magnification of the third lens group.

Further, in order to achieve the above objects, a zoom lens having a function of reducing image vibration according to another embodiment of the present invention comprises in the order from an object side:

a first lens group having a positive refracting power;

a second lens group being provided so as to be shiftable substantially along a direction perpendicular to an optical axis and having a negative refracting power;

a third lens group having a positive refracting power; and a drive section for driving the second lens group, wherein the first and third lens groups are moved toward the object side on the optical axis at the time of varying a focal length of the zoom lens system from wide angle end to telephoto end, and the drive section drives the second lens group so as to satisfy the following condition:

$$\Delta Y = (1-\beta_2)\cdot\beta_3\cdot\Delta S,$$

wherein $\Delta Y$: the shift amount of an image corresponding to movement of the second lens group, $\Delta S$: the shift amount of the second lens group for reducing image vibration, $\beta_2$: the magnification of the second lens group, $\beta_3$: the magnification of the third lens group.

Furthermore, in order to achieve the above objects, a zoom lens with a function of reducing image vibration according to still another embodiment of the present invention comprises in the order from an object side:

a first lens group having a positive refracting power;

a second lens group having a negative refracting power; and a third lens group having a positive refracting power, wherein the first and third lens groups are moved toward the object side on an optical axis at the time of varying a focal length of the zoom lens system from wide angle end to telephoto end and the second lens group is provided so as to be shiftable substantially along a direction perpendicular to the optical axis.

The present invention relates to a zoom lens with a function of reducing image vibration which is utilized in a photographic camera and is constituted of three groups having positive, negative and positive refracting powers respectively. In the present invention, the second lens group is shifted in a direction perpendicular to the optical axis to change an image forming position properly in the same direction thereby to correct a change of an image condition due to movement of hands. That is, the image on the image surface is stabilized by shifting the second lens group (image-stabilization by second lens group).

BRIEF DESCRIPTION OF THE DRAWINGS

FIG. 1 is a diagram showing the structure of zoom lens according to a first embodiment of the present invention;

FIGS. 2A to 2F are graphs showing various aberrations of the zoom lens in FIG. 1;

FIG. 3 is a diagram showing the structure of a zoom lens according to a second embodiment of the present invention;

FIG. 5 is a diagram showing the structure of a zoom lens according to a third embodiment of the present invention;

FIGS. 6A to 6F are graphs showing various aberrations of the zoom lens in FIG. 5; and FIG. 7 is a diagram for explaining another arrangement of a flare diagragm.

DETAILED DESCRIPTION OF THE INVENTION

Figure 2A:
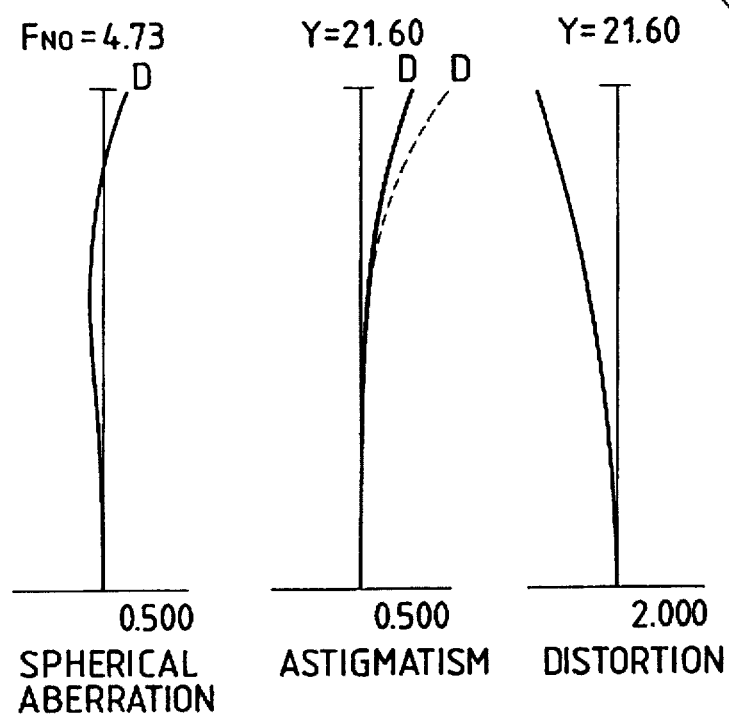

As the function of reducing image vibration of the zoom lens of the present invention, a method is adopted in which a lens-group or one or some lenses thereof are shifted in a direction perpendicular to an optical axis so as to correct a change of an image condition (to stabilize the image) due to movement or vibration of a camera. In order to obtain a practical zoom lens by such a method, it is desirable to make a mechanism for driving the vibration reducing group (the lens group shifted in a direction perpendicular to an optical axis) of the optical system simple. Therefore, it is desirable to form the vibration reducing group of the optical system so as to be fixed in the optical axis direction or moved in the optical axis direction as small as possible.

Heretofore, when applying a vibration reducing function to a lens group movable in the optical direction at the time of varying the focal length of the zoom lens, a mechanism for reducing image vibration and a mechanism for varying the focal length need to be provided to the same lens group, so that the structure of the lens group (including the mechanisms) becomes complicated. Further, when selecting a lens group movable fairly largely in the optical axis direction as the vibration reducing group, the vibration reducing group is moved largely in both the optical axis direction and the direction perpendicular thereto, so that the structures of the drive mechanisms therefor and the resultant structure of the whole zoom lens become complicated considerably.

In the zoom lens of the present invention having, in the order from the object side, the first to third lens groups with respective positive, negative and positive refracting powers, when the respective lens groups are compared to each other, not only the diameters of the lenses of the first group but also the weights thereof are largest. Therefore, if the first lens group were selected as the vibration reducing group, the vibration reducing mechanism would be complicated. Further, as compared to the second lens group, the whole length of the third lens group is larger and the shift amount thereof at the time of varying the focal length of the zoom lens is also larger. As a result, if the third lens group were selected as the vibration reducing group, the vibration reducing mechanism would become complicated.

On the other hand, the diameters of the lenses of the second lens group can be made smaller than those of the first lens group and the whole length of the second lens group can be made shorter than that of the third lens group. Further, it is possible to make the shift amount of the second lens group minimum among the three lens groups at the time of varying the focal length of the zoom lens and to fix the second lens group in the optical axis direction. Further, if the second lens group is selected as the vibration reducing group, preferable image forming performance can be achieved both in varying the focal length of the zoom lens and in reducing image vibration from the viewpoint of aberrations. Therefore, in the zoom lens of the present invention having first to third lens groups with respective positive, negative and positive refracting powers, in that order from the object side, it is preferable to select the second lens group as the vibration reducing group.

Thus, in the zoom lens of the present invention which has the first to third lens groups with positive, negative and positive refracting powers in that order from the object side and in which the second lens group is selected as the vibration reducing group, preferable image forming characteristics can be achieved especially as a general 35 mm photographic lens in a standard area and in a telephoto area and miniaturization can be achieved in spite of having the vibration reducing function.

The zoom lens of the present invention as structured above satisfies the following condition:

$$\Delta Y = (1-\beta_2) \cdot \beta_3 \cdot \Delta S, \quad (1)$$

wherein $\Delta S$: the shift amount (in the direction perpendicular to the optical axis of the second lens group $G_2$ for reducing vibration, $\Delta Y$: the shift amount of an image corresponding to $\Delta S$.

$\beta_2$: the magnification of the second lens group, $\beta_3$: the magnification of the third lens group.

Here, the signs of figures of $\Delta Y$ and $\Delta S$ are set to be plus in the upward movement in the diagrams showing light paths (diagrams showing the structures of lenses) and minus in the downward movement therein.

Further, in order to achieve preferable image forming performance, in addition to the above structure of the present invention, it is preferable to satisfy the following condition:

$$0.1 < |f2|/(fW \cdot fT)^{1/2} < 1.0 \quad (2)$$

wherein f2: the focal length of the second lens group $G_2$, fW: the whole focal length of the zoom lens system in the end of a wide angle area, fT: the whole focal length of the zoom lens system in the end of a telephotographic area.

The condition (2) defines the focal length of the second lens group $G_2$ with the vibration reducing function within a proper range.

When exceeding the upper limit of the condition (2), the refracting power of the second lens group $G_2$ becomes too small, whereby spherical aberration is enlarged toward the negative side and the Petzval sum is liable to shift toward the positive side, so that preferable image forming performance cannot be obtained. Further, as a principal ray passing the first lens group $G_1$ is spaced largely apart from the optical axis, the aperture of the first lens group $G_1$ is increased, making it impossible to miniaturize the zoom lens.

When the upper and lower limits of the condition (2) are set to be 0.5 and 0.2 respectively, more preferable image forming performance can be obtained.

Also, in the present invention, in order to achieve preferable image forming performance, it is preferable to satisfy the following condition:

$$-0.2 < \Delta L_2/fW < 0.3, \tag{3}$$

wherein fW: the focal length of the whole zoom lens system in the end of the wide angle area, $\Delta L_2$: a shift amount of the second lens group $G_2$ at the time of varying the focal length of the whole zoom lens system.

The sign of figures of the shift amount $\Delta L_2$ is plus in the movement toward the object side and minus in the movement toward the image side.

The condition (3) defines the shift amount of the second lens group $G_2$ in the optical axis direction at the time of varying the focal length of the zoom lens system.

When departing from the range determined in the condition (3), the shift amount of the second lens group $G_2$ at the time of varying the focal length of the zoom lens becomes too large, which causes the structure of the lenses to be mechanically complicated. Further, not only a change in spherical aberration and but also a change in field curvature become large at the time of varying the focal length of the zoom lens, resulting in complicated aberration correction. Needless to say, the most preferable state of the second lens group $G_2$ is that the value of the condition (3) is equal to zero, i.e., the second lens group $G_2$ is fixed in the optical axis direction. However, no inconvenience occurs in terms of aberrations within the range of the condition (3).

When the upper and lower limits of the condition (3) are set to be 0.2 and 0 respectively, more preferable image forming performance can be obtained.

And, in order to achieve preferable image forming performance, in the present invention, the following condition is preferably satisfied:

$$\Delta_{max}/|f2|<0.1, \tag{4}$$

wherein f2: the focal length of the second lens group $G_2$, $\Delta S_{max}$: the maximum shift amount of the second lens group $G_2$ at the time of reducing image vibration.

The condition (4) defines shift amount of the second lens group $G_2$ in the direction perpendicular to the optical axis at the time of reducing image vibration.

When exceeding the upper limit of the condition (4), the shift amount at the time of reducing image vibration becomes too large, so that changes in aberrations become too large, making it impossible to correct the aberrations sufficiently. Especially, in a peripheral position of an image plane, the difference between an optimum image surface in an m-direction (meridional direction) and that in an s-direction (sagittal direction) in the optical axis direction is enlarged. Further, when the shift amount at the time of reducing image vibration is large, the drive mechanism becomes large, causing the diameter of the lens barrel of the zoom lens to be increased.

Thus, from the viewpoint of miniaturizing the diameter of the lens barrel of the zoom lens, the smaller the value of the condition (4) becomes, the more the preference is obtained. However, when the value of the condition (4) is less than the upper limit, miniaturization can be achieved to some extent by setting other conditions. Also, it is possible to perform aberration corrections more preferably by utilizing, e.g., a nonspherical lens, In order to obtain further preferable image forming performance, in addition to the above conditions, the following condition is preferably satisfied:

$$-1.2 < r\_/f2 < -0.2, \tag{5}$$

wherein f2: the focal length of the second lens group $G_2$, r\_: the radius of curvature of the image-side surface of a concave lens of the second lens group $G_2$ located closest to the object side.

When departing from the range defined in the condition (5), the corrections of downward comatic aberration and field curvature in the wide angle end become difficult and the correction of spherical aberration in the telephoto end area becomes difficult.

When the upper and lower limits of the condition (5) are set to be −0.6 and −1.0 respectively, more preferable image forming performance can be obtained.

In order to obtain more preferable image forming performance, in addition to the above conditions, the following condition is preferably satisfied:

$$L/fW<1.0, \tag{6}$$

wherein

L: the entire length (along the optical axis) of the vibration reducing lens group $G_2$ on the optical axis, fW: the focal length of the whole zoom lens system in the wide angle end.

When exceeding the upper limit of the condition (6), the entire length of the vibration reducing group, i.e., the entire length of the second lens group $G_2$ becomes large and the weight of the lens system is increased. Further, the structure of a vibration reducing mechanism becomes large and complex.

In order to obtain further preferable image forming performance, when structuring the second lens group $G_2$ as the vibration reducing group, the following condition is preferably satisfied:

$$-3 < q_{21} < 0, \tag{7}$$

wherein $q_{21}$: a shape factor of the concave lens of the second lens group $G_2$ closest to the object side.

When the radius of curvature of the object-side side surface of the concave lens is $r_a$ and the radius of curvature of the image-side surface thereof is $r_b$, the shape factor $q_{21}$ is given by:

$$q_{21}=(r_b+r_a)/(r_b-r_a). \tag{8}$$

When departing from the range defined in the condition (7), the correction of spherical aberration, comatic aberration and field curvature becomes difficult, so that preferable image forming performance cannot be obtained.

Further, in order to obtain preferable image forming performance, when structuring the second lens group $G_2$ as the vibration reducing group, the following condition is preferably satisfied:

$$1.6<n_{21}. \tag{9}$$

wherein $n_{21}$: the refractive index of the concave lens of the second lens group $G_2$ closest to the object side.

The refractive index is the value with respect to d-line (λ=587.6 nm).

When the refractive index is less than the lower limit of the condition (9), the Petzval sum becomes large toward the negative side and field curvature is shifted toward the negative side. Also, an astigmatic difference is enlarged. Therefore, preferable image forming performance cannot be obtained.

Further, it is preferable to provide a flare diaphragm so as to be fixed with respect to the optical system in addition to an aperture diaphragm, because the second lens group $G_2$ is the vibration reducing group. Specifically, when the second lens group $G_2$ is shifted in a direction perpendicular to the optical axis, pencils of rays in a peripheral position away from the optical axis are incident on the following third lens group $G_3$ as unnecessary pencils of rays depending on its shift amount. Such unnecessary light causes a ghost or an unnecessary exposure. However, by providing the fixed flare diaphragm, it is possible to prevent such unnecessary incident light.

Although the disposition of the flare diaphragm is not limited to a specific position, it is possible to eliminate the unnecessary light most effectively when it is disposed in the vicinity of the object side of the second lens group $G_2$ as shown in FIG. 7. If the unnecessary light to the image forming position can be effectively shielded, the flare diaphragm may be disposed in other positions. Such a flare diaphragm is not an indispensable element for the zoom lens of the present invention but has an effective function in accordance with separate design conditions.

Furthermore, when a nonspherical lens is utilized in the second lens group, more preferable image forming performance and vibration reducing performance can be attained.

DESCRIPTION OF THE PREFERRED EMBODIMENTS

Preferred embodiments of the present invention will be described below with reference to the accompanying drawings. In each embodiment, as shown in FIG. 1, a zoom lens system with a function of reducing vibration has, in the order from an object side, a first lens group $G_1$ with a positive refracting power, a second lens group $G_2$ with a negative refracting power and a third lens group $G_3$ with a positive refracting power. Further, in the zoom lens system of the present invention, the first lens group $G_1$ and the third lens group $G_3$ are shifted toward the object side at the time of varying a focal length of the zoom lens system from the wide angle end to the telephoto end.

Also, the zoom lens system of each embodiment of the present invention is provided with a vibration detecting device 10 for detecting vibration of the zoom lens system, a drive device 20 for shifting the second lens group $G_2$ substantially along a direction perpendicular to an optical axis and a control unit 30 for controlling the drive device 20, based on the output of the vibration detecting device 10 so as to correct a change of an image due to vibration.

As the vibration detecting device 10, e.g., an angular velocity sensor or an angular acceleration sensor can be utilized. As the drive device 20, a motor, a coreless motor or a piezo element can be utilized. The structures of the vibration detecting device 10, the drive device 20 and the control unit 30 may be those described in commonly assigned U.S. patent Ser. No. 08/129,580 (filed Sep. 30, 1993) and the description thereof is omitted here by referring to U.S. patent Ser. No. 08/129,580.

In each embodiment of the present invention, a deviation (angle) $\Delta w$ of the optical axis considered on the object side of the zoom lens is controlled to be corrected regardless of a zoom position to satisfy:

$$\Delta S_c = \Delta S w \cdot \beta_2^z \cdot (1-\beta_2^w)/(\beta_2^w \cdot (1-\beta_2^z)), \tag{10}$$

wherein $\Delta S_c$: the amount of a change for reducing image vibration (a corrected amount of the vibration reducing group) in any zoom position, $\Delta S_w$: the amount of a change for reducing vibration necessary for correcting the deviation $\Delta w$ in the wide angle end, $\beta_2^z$: the image magnification of the second lens group $G_2$ in any zoom position, $\beta_2^w$: the image magnification of the second lens group $G_2$ in the wide angle end.

In each embodiment of the present invention, in order to perform the above control, an encoder 40 is provided for detecting the position of the first lens group $G_1$ along the optical axis at the time of varying the focal length of the zoom lens. The control section 30 is provided with a ROM (Read Only Memory) 35. The ROM 35 stores a reference table indicating a relationship between the above magnification $\beta_2^z$ and the position of the first lens group $G_1$ along the optical axis.

In each embodiment, based on the output of the encoder 40, the control unit 30 refers to the ROM 35 (reference table) to obtain the magnification $\beta_2^w$ of the second lens group $G_2$. The magnification $\beta_2^w$ may be obtained not by detecting the position of the first lens group $G_1$ along the optical axis but by detecting the position of the third lens group $G_3$ along the optical axis by means of an encoder. Also, if the lens group $G_2$ is moved along the optical axis at the time of varying the focal length of the zoom lens, the position of the second lens group $G_2$ along the optical axis may be detected by an encoder. Further, the encoder 40 may be structured to detect the positions of two or more lens groups along the optical axis.

As the encoder 40, e.g., a linear or rotary encoder can be utilized. When a linear encoder is utilized, it is possible to adopt a structure in which the position of the lens group to be detected along the optical axis is directly detected, i.e., a structure in which the position of a member for supporting the lens group is detected. On the other hand, when a rotary encoder is utilized, it is possible to adopt a structure in which a member rotating around the optical axis at the time of varying the focal length of the zoom lens, i.e., an angle of rotation of the lens barrel with cam grooves or the like is detected.

When the magnification $\beta_2^z$ is changed in accordance with the object distance, the position of the lens group shifted along the optical axis at the time of focusing is detected by the encoder. Then, the control unit 30 refers to the output of the encoder and the reference table indicating the relationship between the position of the lens group and the magnification $\beta_2^z$ to obtain the magnification $\beta_2^z$.

Furthermore, in each embodiment, when the shift amount (in the direction perpendicular to the optical axis) of the second lens group $G_2$ for reducing image vibration is $\Delta S$, the shift amount of an image corresponding thereto is $\Delta Y$, the magnification of the second lens group $G_2$ is $\beta_2$ and the magnification of the third lens group $G_3$ is $\beta_3$, the following condition is satisfied:

$$\Delta Y = (1-\beta_2) \cdot \beta_3 \cdot \Delta S.$$

The image of the object on the image surface is stabilized by satisfying the above condition.

[First Embodiment]

FIG. 1 shows the structure of a zoom lens system according to a first embodiment of the present invention. The zoom lens system has, in the order from an object side, a first lens group $G_1$ consisting of a biconvex lens and a cemented lens formed by cementing a negative meniscus lens with a convex surface directed to the object side and a positive meniscus lens with a convex surface directed to the object side; a second lens group $G_2$ consisting of a cemented lens formed by cementing a biconcave lens and a positive meniscus lens with a convex surface directed to the object side and a biconcave lens; and a third lens group $G_3$ consisting of a biconvex lens, a Cemented lens formed by cementing a biconvex lens and a negative meniscus lens with a concave surface directed to the object side, a positive meniscus lens with a convex surface directed to the object side, a negative meniscus lens with a concave surface directed to the object side and a positive meniscus lens with a concave surface directed to the object side.

An aperture diaphragm S and a flare diaphragm FS are provided in the third lens group $G_3$.

FIG. 1 shows the positions of the respective lens groups in the wide angle end. When varying the focal length of the zoom lens toward the telephoto end, the respective lens group $G_1$ and $G_3$ are moved on the optical axis along respective loci indicated by arrows in the drawing. On the other hand, the second lens group $G_2$ is fixed in the optical axis direction and driven by the drive device 20 in the direction perpendicular to the optical axis. Thereby, the fluctuation of an image due to vibration of the zoom lens system is corrected.

Thus, in the first embodiment, the present invention is applied to the telephoto area and, at the time of varying the focal length of the zoom lens, the first and third lens groups $G_1$ and $G_3$ are moved toward the object side while the second lens group $G_2$ is fixed in the optical axis direction.

The following Table 1 shows values of elements of the first embodiment of the present invention. In the Table 1, f, $F_{NO}$, $2\omega$ and Bf represent the focal length, the F-number, the angle of view and the back focus respectively. Left end figures indicate the order of the respective lens surfaces from the object side. r, d and n represent the radius of curvature of each lens surface, the distance between lens surfaces and the refractive index with respect to d-line ($\lambda=587.6$ nm) respectively.

TABLE 1 f = 83.741–191
$F_{NO}$ = 4.73–5.62
$2\omega$ = 29.5°–12.62°

| | r | d | n |
|---|---|---|---|
| 1 | 145.000 | 4.000 | 1.51680 |
| 2 | −321.689 | 0.115 | |
| 3 | 90.294 | 2.000 | 1.80458 |
| 4 | 51.457 | 7.000 | 1.51680 |
| 5 | 3697.266 | (d5 = variable) | |
| 6 | −101.030 | 1.200 | 1.65160 |
| 7 | 23.252 | 3.500 | 1.86074 |
| 8 | 47.217 | 4.830 | |
| 9 | −54.312 | 1.000 | 1.65160 |
| 10 | 248.593 | (d10 = variable) | |
| 11 | 103.677 | 5.175 | 1.50137 |
| 12 | −47.132 | 0.230 | |
| 13 | 79.840 | 6.095 | 1.51860 |
| 14 | −36.209 | 1.610 | 1.75520 |
| 15 | −776.898 | 0.920 | |
| 16 | 32.828 | 4.140 | 1.71300 |
| 17 | 51.637 | 46.230 | |
| 18 | −19.967 | 2.415 | 1.76684 |
| 19 | −39.758 | 0.230 | |

TABLE 1-continued

| 20 | −276.987 | 3.220 | 1.72825 |
|---|---|---|---|
| 21 | −52.023 | (Bf) | |

(variable distance at the time of varying focal length)

| f | 83.741 | 191.000 |
|---|---|---|
| D0 | ∞ | ∞ |
| d5 | 1.615 | 34.484 |
| d10 | 22.925 | 6.526 |
| Bf | 45.202 | 61.601 |

(values corresponding to conditions)

$f2 = -31.843$
$fW = -83.741$
$fT = 191$
$\Delta Smax = 0.17558$
$r- = 23.252$
$L = 10.53$
$\Delta L_2 = 0$
(2) $|f2/(fW \cdot fT)^{1/2}| = 0.25178$
(3) $\Delta L_2/fw = 0$
(4) $\Delta Smax/|f2| = 0.00553$
(6) $r-/f2 = -0.7302$
(7) $L/fW = 0.1257$
(8) $q_{21} = -0.6258$
(9) $n_{21} = 1.6516$ (data in reducing vibration)

| optical axis of second lens group | wide angle end | telephoto end |
|---|---|---|
| shift amount in perpendicular direction (mm) | 0.17558 | 0.17558 |
| shift amount of image (mm) | −0.40653 | −0.63666 |

Figure 2B:
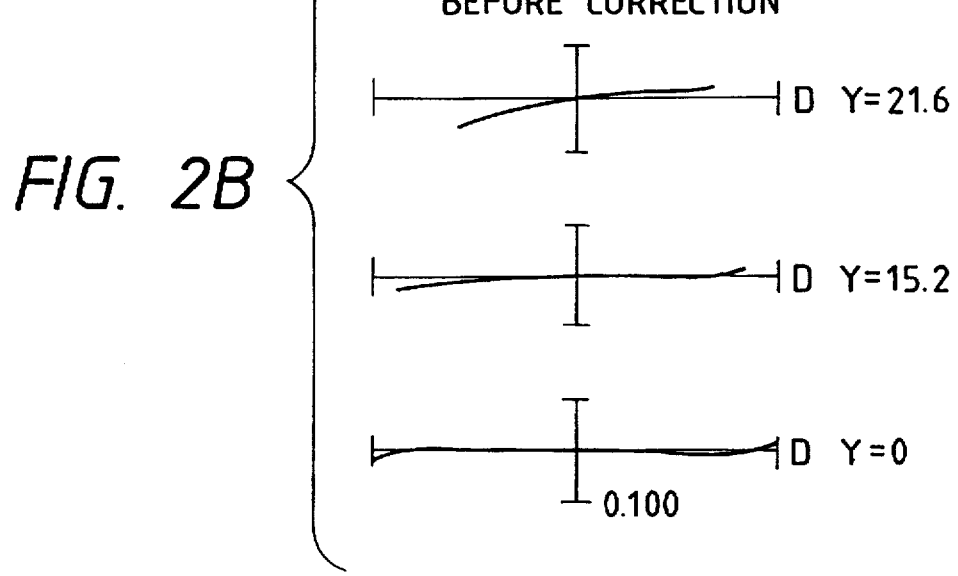
Figure 2E:
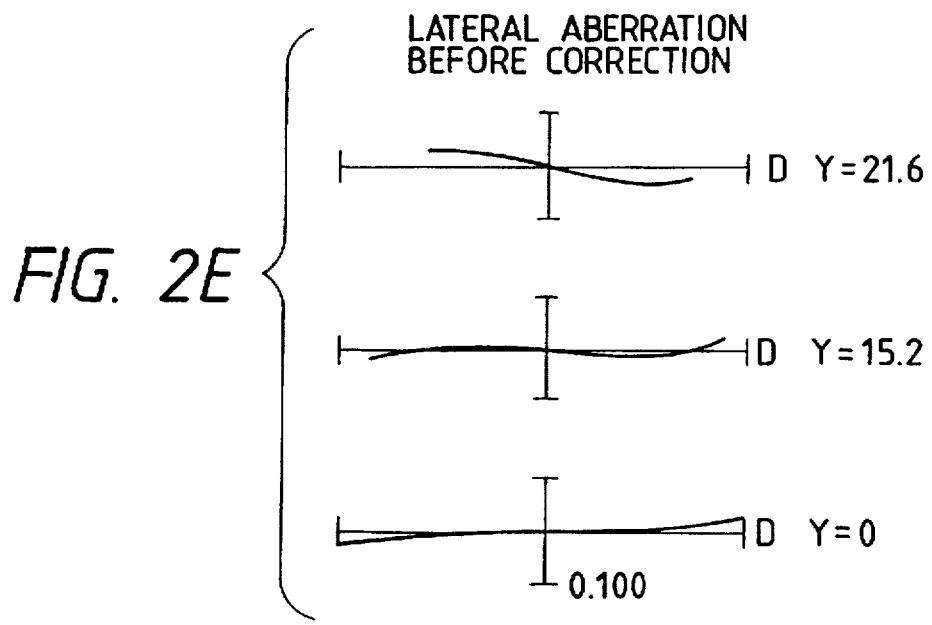
Figure 2F:
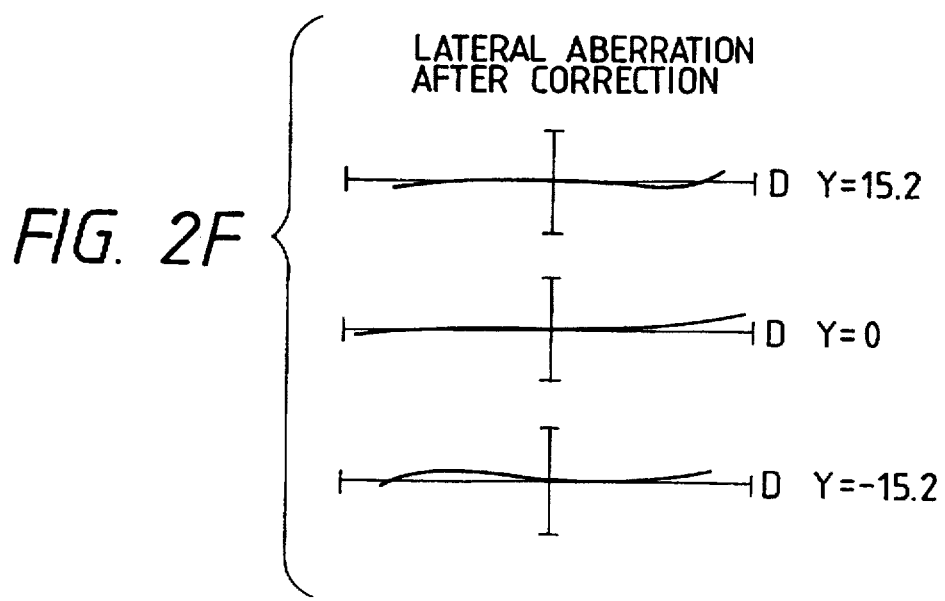

FIGS. 2A to 2C are graphs showing respectively longitudinal aberration in the wide angle end, lateral aberrations before correction for reducing image vibration in the wide angle end, and lateral aberrations after correction for reducing image vibration in the wide angle end. FIGS. 2D to 2E are graphs showing respectively longitudinal aberrations in the telephoto end, lateral aberrations before correction for reducing image vibration in the telephoto end, and lateral aberrations after correction for reducing image vibration in the telephoto end. In the graphs, $F_{NO}$, Y and D represent the F-number, the height of the image and the d-line ($\lambda=587.6$ nm) respectively. Also, in each graph showing astigmatism, a solid line indicates a sagittal image surface while a broken line indicates a meridional image surface.

As is apparent from the graphs, various aberrations are corrected preferably before and after the operation of reducing image vibration in this embodiment.

[Second Embodiment]

FIG. 3 shows the structure of a zoom lens system according to a second embodiment of the present invention. The zoom lens system has, in the order from the object side, a first lens group $G_1$ consisting of a cemented lens formed by cementing a negative meniscus lens with a convex surface directed to the object side and a biconvex lens, a positive meniscus lens with a convex surface directed to the object side and a positive meniscus lens with a convex surface directed to the object side; a second lens group $G_2$ consisting of a negative meniscus lens with a convex surface directed to the object side, a cemented lens formed by cementing a positive meniscus lens with a convex surface directed to the object side and a lens and a lens and a cemented lens formed by cementing a biconcave lens and a biconvex lens; and a third lens group $G_3$ consisting of a biconvex lens, a biconvex lens, a biconcave lens, a biconvex lens, a biconcave lens, a biconvex lens and a cemented lens formed by cementing a biconvex lens and a negative meniscus lens with a concave surface directed to the object side. In this embodiment, an aperture diaphragm S is provided in the light path between the second lens group $G_2$ and the third lens group $G_3$.

FIG. 3 shows the respective positions of the lens groups in the wide angle end. When varying the focal length of the zoom lens toward the telephoto end, the lens groups $G_1$ and $G_3$ are shifted on the optical axis along loci indicated by arrows in the drawing. On the other hand, the second lens group $G_2$ is fixed in the optical axis direction at that time and driven in a direction perpendicular to the optical axis by the drive device 20. Thereby, the fluctuation of an image due to vibration of the zoom lens system is corrected.

Thus, in the second embodiment, the present invention is applied to the standard area. Also, the fundamental structure of the zoom lens system of this embodiment is the same as that in the first embodiment but the refracting power and shape of the zoom lens system is different from those in the first embodiment.

The following Table 2 shows values of elements of the second embodiment of the present invention. In the Table 2, f, $F_{NO}$, 2ω and Bf represent the focal length, the F-number, the angle, of view and the back focus respectively. Figures on the left side indicate the order of the respective lens surfaces from the object side. r, d and n represent the radius of curvature of each lens surface, the distance between lens surface and the refractive index with respect to d-line (λ=587.6 nm) respectively.

TABLE 2 f = 36.0–102.02
$F_{NO}$ = 3.33–3.73
2ω = 63.8°–23.24°

|  | r | d | n |
|---|---|---|---|
| 1 | 1288.781 | 1.500 | 1.80518 |
| 2 | 116.440 | 8.900 | 1.51454 |
| 3 | −160.500 | 0.200 |  |
| 4 | 184.197 | 4.000 | 1.51680 |
| 5 | 382.746 | 0.200 |  |
| 6 | 54.363 | 5.000 | 1.71300 |
| 7 | 93.059 | (d7 = variable) |  |
| 8 | 71.277 | 1.200 | 1.78797 |
| 9 | 21.057 | 5.000 |  |
| 10 | −451.452 | 4.600 | 1.79631 |
| 11 | −21.196 | 1.000 | 1.56384 |
| 12 | 65.851 | 4.900 |  |
| 13 | −17.663 | 1.000 | 1.56732 |
| 14 | 40.651 | 4.800 | 1.79504 |
| 15 | −62.839 | (d15 = variable) |  |
| 16 | 50.139 | 3.400 | 1.62041 |
| 17 | −190.272 | 0.200 |  |
| 18 | 28.721 | 6.100 | 1.62041 |
| 19 | −530.302 | 1.500 |  |
| 20 | −46.300 | 1.200 | 1.78197 |
| 21 | 155.006 | 0.200 |  |
| 22 | 48.284 | 4.500 | 1.62004 |
| 23 | −44.812 | 0.200 |  |
| 24 | −171.425 | 1.300 | 1.80518 |
| 25 | 24.761 | 3.000 |  |
| 26 | 164.062 | 4.100 | 1.51680 |
| 27 | −45.500 | 0.200 |  |
| 28 | 55.542 | 8.600 | 1.54814 |
| 29 | −19.714 | 1.300 | 1.79631 |
| 30 | −71.489 | (Bf) |  |

TABLE 2-continued (variable distance at the time of varying focal length)

| f | 36.000 | 102.020 |
|---|---|---|
| D0 | ∞ | ∞ |
| d7 | 1.280 | 39.220 |
| d15 | 19.860 | 1.720 |
| Bf | 49.255 | 67.401 |

(values corresponding to conditions)

f2 = −24.471
fW = 36.0
fT = 102.02
ΔSmax = 0.14052
r− = 21.057
L = 22.5
ΔL$_2$ = 0
(2) |f2/(fW · fT)$^{1/2}$| = 0.4038
(3) ΔL$_2$/fW = 0
(4) ΔSmax/|f2| = 0.00576
(6) r−/f2 = −0.8605
(7) L/fW = 0.625
(8) q$_{21}$ = −1.839
(9) n$_{21}$ = 1.78797

(data in reducing vibration)

| optical axis of second lens group | wide angle end | telephoto end |
|---|---|---|
| shift amount in perpendicular direction (mm) | 0.14052 | 0.14052 |
| shift amount of image (mm) | −0.18790 | −0.34008 |

Figure 4A:
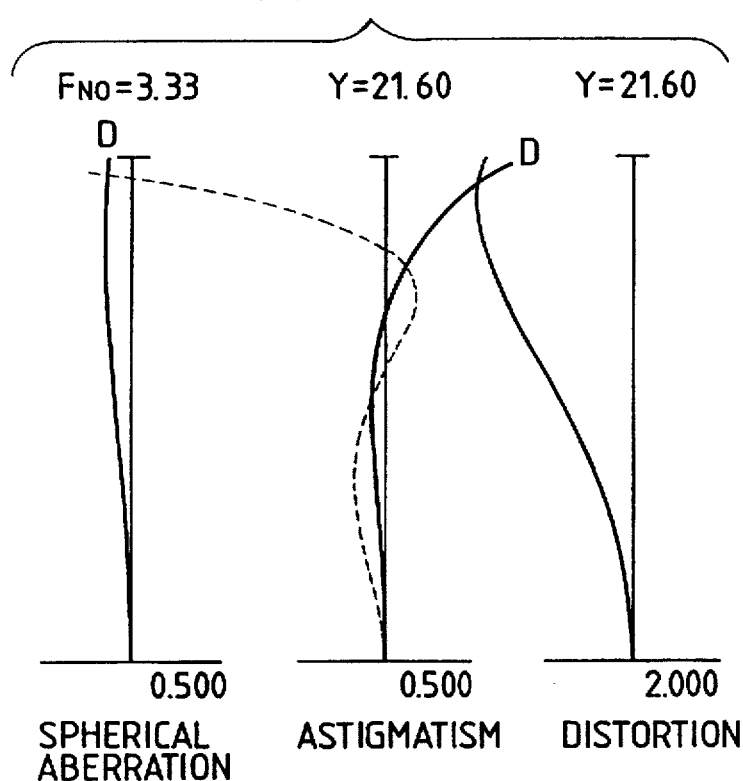
FIGS. 4A to 4F are graphs showing various aberrations of the zoom lens in FIG. 5.
Figure 4B:
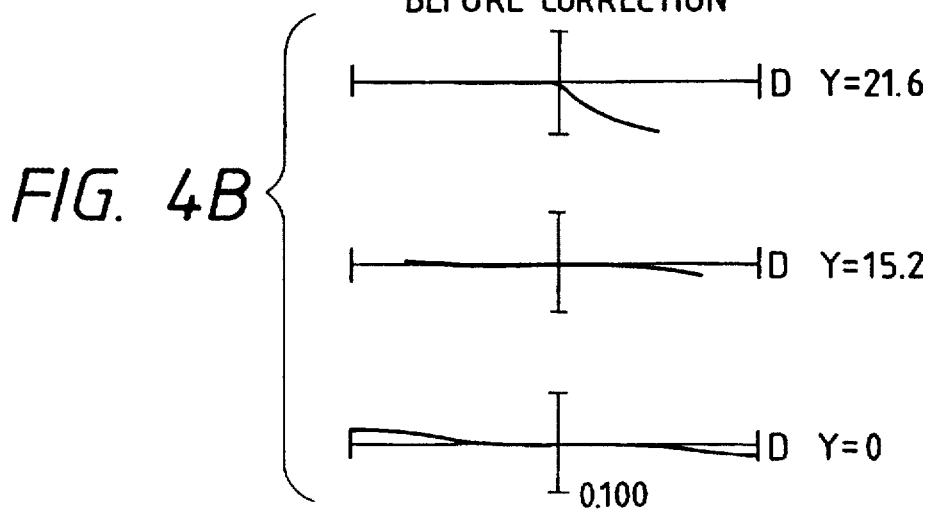
Figure 4C:
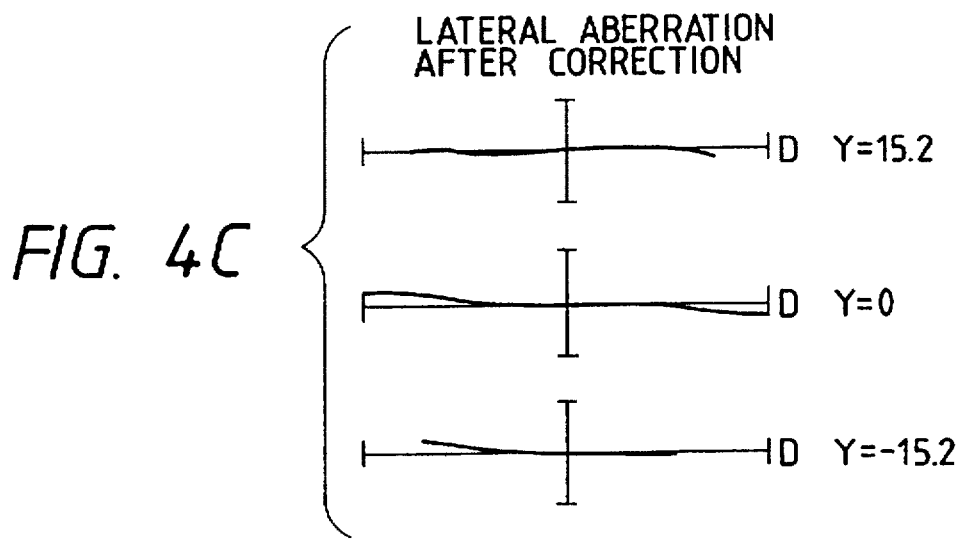
Figure 4D:
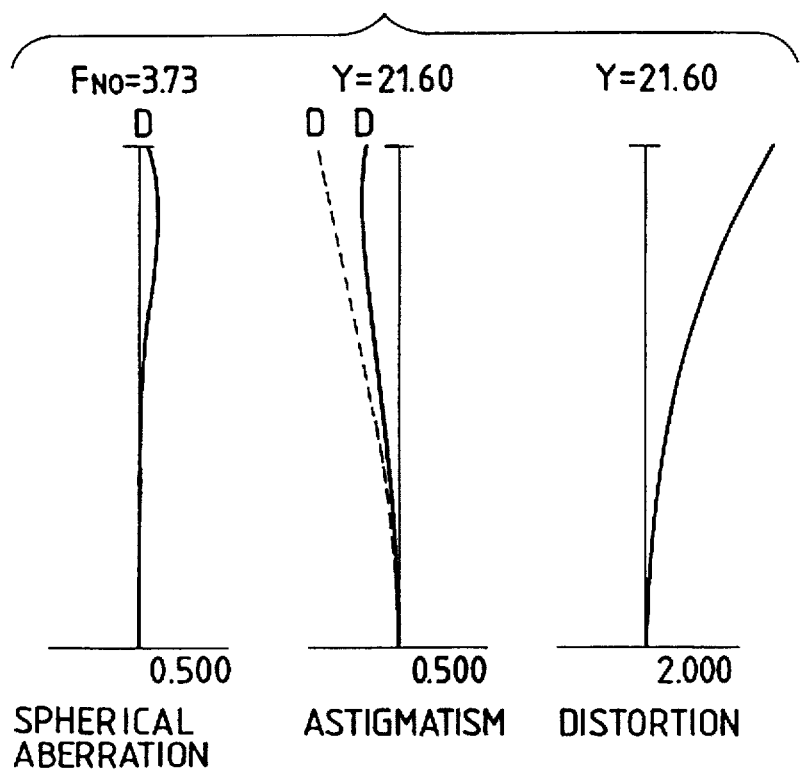
Figure 4E:
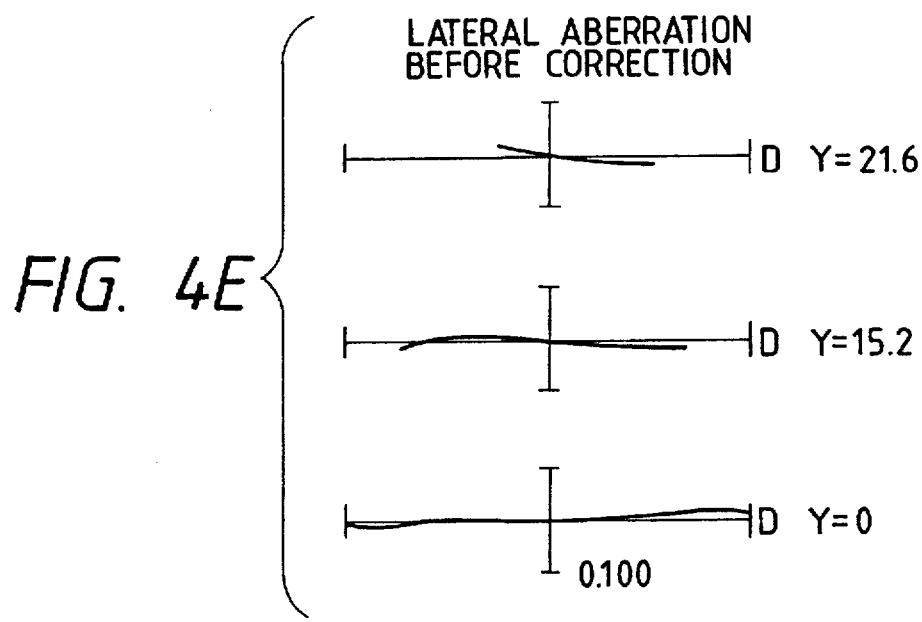
Figure 4F:
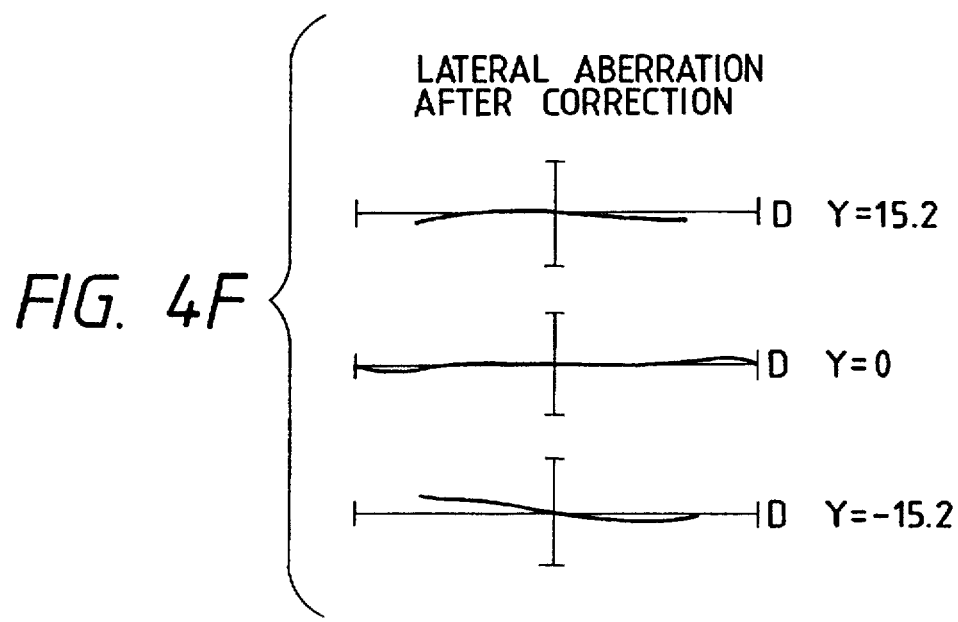

FIGS. 4A to 4C are graphs showing respectively longitudinal aberrations in the wide angle end, lateral aberrations before correction for reducing image vibration in the wide angle end, and lateral aberrations after correction for reducing image vibration in the wide angle end. FIGS. 4D to 4E are graphs showing respectively longitudinal aberrations in the telephoto end, lateral aberrations before correction for reducing image vibration in the telephoto end, and lateral aberrations after correction for reducing image vibration in the telephoto end. In the graphs, $F_{NO}$, Y and D represent the F-number, the height of the image and the d-line (λ=587.6 nm). Also, in each graph showing astigmatism, a solid line indicates a sagittal image surface while a broken line indicates a meridional image surface.

As is apparent from the graphs, various aberrations are corrected preferably before and after the operation of reducing vibration in this embodiment.

[Third Embodiment]

FIG. 5 shows the structure of a zoom lens according to a third embodiment of the present invention. The zoom lens has, in the order from the object side, a first lens group $G_1$ consisting of a positive meniscus lens with a convex surface directed to the object side and a cemented lens formed of cementing a negative meniscus lens with a convex surface directed to the object side, and a biconvex lens; a second lens group $G_2$ consisting of a cemented lens formed by cementing a biconcave lens and a positive meniscus lens with a convex surface directed to the object side, and a biconcave lens; and a third lens group $G_3$ consisting of a biconvex lens, a cemented lens formed by cementing a biconvex lens and a negative meniscus lens with a concave surface directed to the object side, a positive meniscus lens with a convex surface directed to the object side, a negative meniscus lens with a concave surface directed to the object side, and a biconvex lens. Also, an aperture diaphragm S and a flare diaphragm FS are provided in the light path of the third lens group $G_3$ between the positive meniscus lens with the convex surface directed to the object side and the negative meniscus lens with the concave surface directed to the object side.

FIG. 5 shows the respective positions of the lens groups in the wide angle end. When varying the focal length of the zoom lens toward the telephoto end, the respective lens groups are shifted on the optical axis along respective loci indicated by arrows in the drawing. The second lens group $G_2$ is also driven by a drive device 20 approximately in the direction perpendicular to the optical axis. Thereby, the fluctuation of an image due to vibration of the zoom lens system is corrected.

Thus, in the third embodiment, the present invention is applied to the telephoto area and the fundamental structure of the zoom lens is the same as that in the first embodiment. However, the third embodiment is different from the first embodiment in that the second lens group $G_2$ is also moved along the optical axis. Also, the refracting power and shape of the zoom lens are different from those in the first embodiment. The zoom ratio of the zoom lens of this embodiment is 3:1.

The following Table 3 shows values of elements of the third embodiment of the present invention. In the Table 3, f, $F_{NO}$, 2ω and Bf represent the focal length, the F-number, the angle of view and the back focus respectively. Figures on the leftest side indicate the order of the respective lens surfaces from the object side. r, d and n represent the radius of curvature of each lens surface, the distance between lens surfaces and the refractive index with respect to d-line (λ=587.6 nm) respectively.

[TABLE 3]

| | f = 71.484–204.986 | |
| | $F_{NO}$ = 4.08–5.48 | |
| | 2ω = 34.68°–11.78° | |
| r | d | n |
| --- | --- | --- |
| 1 | 124.745 | 3.700 | 1.51680 |
| 2 | 4325.365 | 0.100 | |
| 3 | 87.610 | 2.000 | 1.80458 |
| 4 | 52.453 | 7.700 | 1.51680 |
| 5 | −416.541 | (d5 = variable) | |
| 6 | −150.751 | 1.200 | 1.65160 |
| 7 | 20.543 | 3.400 | 1.86074 |
| 8 | 36.374 | 4.200 | |
| 9 | −35.484 | 1.200 | 1.65160 |
| 10 | 2544.210 | (d10 = variable) | |
| 11 | 102.637 | 4.500 | 1.50137 |
| 12 | −38.242 | 0.200 | |
| 13 | 64.391 | 5.300 | 1.51860 |
| 14 | −31.604 | 1.400 | 1.75520 |
| 15 | −370.566 | 0.800 | |
| 16 | 29.236 | 3.600 | 1.71300 |
| 17 | 44.126 | 40.200 | |
| 18 | −18.138 | 2.100 | 1.76684 |
| 19 | −28.876 | 0.200 | |
| 20 | −4032.011 | 2.800 | 1.72825 |
| 21 | −71.443 | (Bf) | |

(variable distance at the time of varying focal length)

| f | 71.484 | 204.986 |
| --- | --- | --- |
| D0 | ∞ | ∞ |
| d5 | 1.741 | 36.548 |
| d10 | 16.955 | 1.035 |
| Bf | 40.899 | 68.732 |

[TABLE 3]-continued (values corresponding to conditions)

f2 = −26.7
fW = 71.484
fT = 204.986
ΔSmax = 0.15722
r- = 20.543
L = 10
$\Delta L_2$ = 11.9135
(2) $|f2/(fW \cdot fT)^{1/2}|$ = 0.221
(3) $\Delta L_2/fW$ = 0.1666
(4) $\Delta Smax/|f2|$ = 0.00588
(6) r-/f2 = −0.7694
(7) L/fW = −0.1399
(8) $q_{21}$ = −0.7601
(9) $n_{21}$ = 1.6516

(data in reducing vibration)

| optical axis of second lens group | wide angle end | telephoto end |
| --- | --- | --- |
| shift amount in perpendicular direction (mm) | 0.15722 | 0.15722 |
| shift amount of image (mm) | −0.36903 | −0.68316 |

Figure 6A:
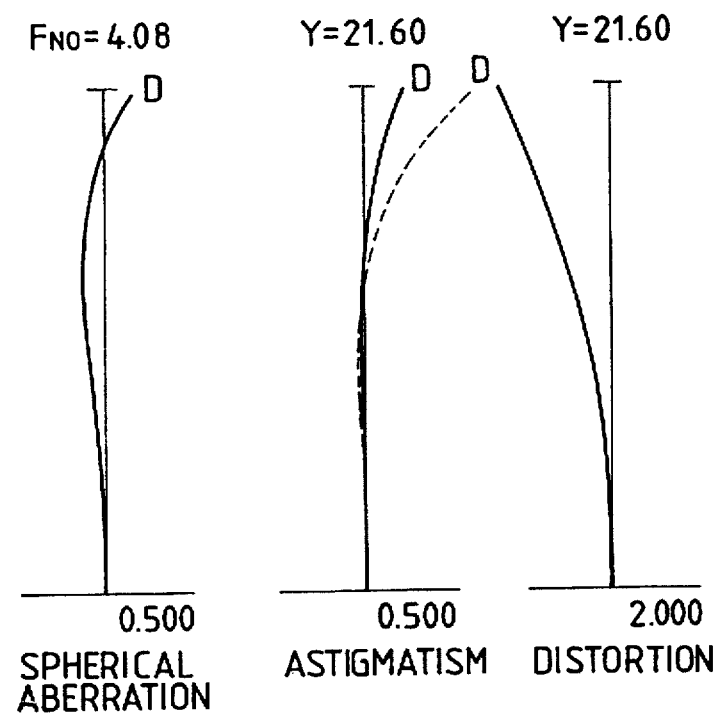
Figure 6B:
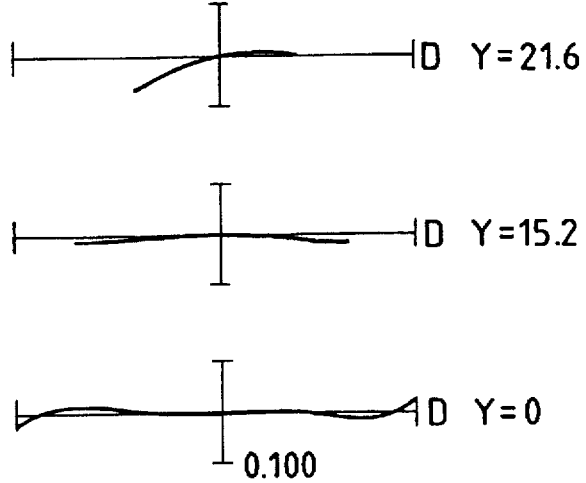
Figure 6E:
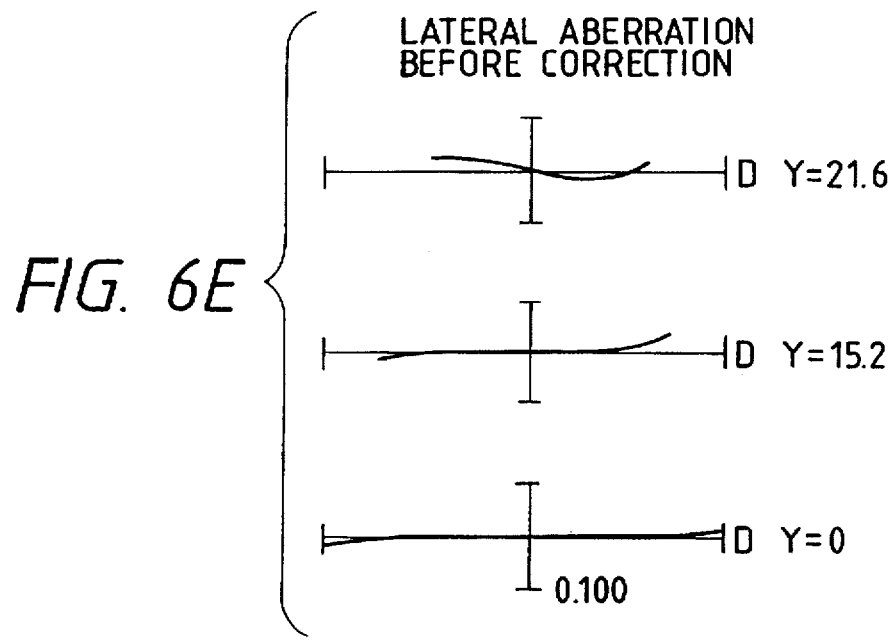
Figure 6F:
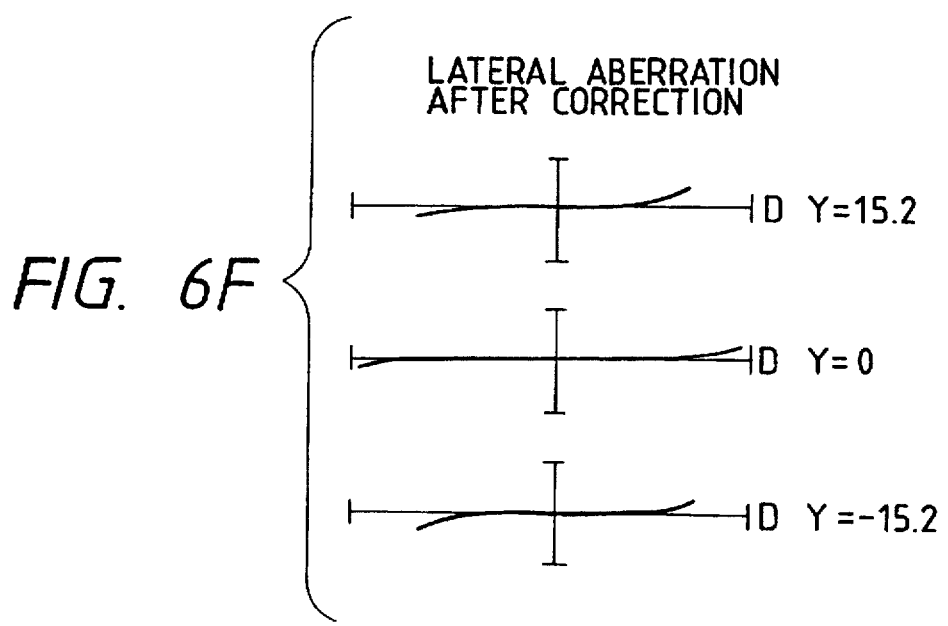

FIGS. 6A to 6C are graphs showing respectively longitudinal aberrations in the wide angle end, lateral aberrations before correction for reducing image vibration in the wide angle end, and lateral aberrations after correction for reducing image vibration in the wide angle end. FIGS. 6D to 6E are graphs, showing respectively longitudinal aberrations in the telephoto end, lateral aberrations before correction for reducing image vibration in the telephoto end, and lateral aberrations after correction for reducing image vibration in the telephoto end. In the graphs, $F_{NO}$, Y and D represent the F-number, the height of the image and the d-line (λ=587.6 nm) respectively. Also, in each graph showing astigmatism, a solid line indicates a sagittal image surface while a broken line indicates a meridional image surface.

As is apparent from the graphs, various aberrations are corrected preferably before and after the operation of reducing image vibration in this embodiment.

Although the entire second lens group is shifted by the drive device 20 in a direction perpendicular to the optical axis in this embodiment, one or some lenses of the second lens group may be shifted. For example, in the first embodiment of FIG. 1, the cemented lens or the negative lens of the second lens group $G_2$ can be shifted. In the second embodiment of FIG. 3, at least one lens among the negative meniscus lens with the convex surface directed to the object side, the cemented lens formed by cementing the positive meniscus lens with the concave surface directed to the object side and the biconcave lens, and the cemented lens formed by cementing the biconcave lens and the biconvex lens in the second lens group $G_2$ can be shifted in a direction perpendicular to the optical axis.

What is claimed is:

1. A zoom lens system with a function of reducing image vibration comprising in the order from an object side:

a first lens group having a positive refracting power;

a second lens group being provided so as to be shiftable substantially along a direction perpendicular to an optical axis and having a negative refracting power; and a third lens group having a positive refracting power, a drive section for driving said second lens group, wherein said first and third lens groups are moved toward the object side on said optical axis at the time of varying a focal length of said zoom lens system from wide angle end to telephoto end, and said drive section drives said second lens group so as to satisfy the following condition:

$$\Delta Y=(1-\beta_2)\cdot\beta_3\cdot\Delta S,$$

wherein $\Delta Y$: a shift amount of an image corresponding to movement of said second lens group, $\Delta S$: a shift amount of said second lens group for reducing image vibration, $\beta_2$: an image magnification of said second lens group, $\beta_3$: an image magnification of said third lens group, and wherein the following condition is satisfied:

$$-1.2 < r\_/f2 < -0.2,$$

wherein $r\_$: a radius of curvature of an image-side surface of a concave lens of said second lens group located closest to the object side, $f2$: a focal length of said second lens group.

2. A zoom lens system with a function of reducing image vibration comprising in the order from an object side:

a first lens group having a positive refracting power;

a second lens group being provided so as to be shiftable substantially along a direction perpendicular to an optical axis and having a negative refracting power; and a third lens group having a positive refracting power, a drive section for driving said second lens group, wherein said first and third lens groups are moved toward the object side on said optical axis at the time of varying a focal length of said zoom lens system from wide angle end to telephoto end, and said drive section drives said second lens group so as to satisfy the following condition:

$$\Delta Y=(1-\beta_2)\cdot\beta_3\cdot\Delta S,$$

wherein $\Delta Y$: a shift amount of an image corresponding to movement of said second lens group, $\Delta S$: a shift amount of said second lens group for reducing image vibration, $\beta_2$: an image magnification of said second lens group, $\beta_3$: an image magnification of said third lens group, and wherein the following condition is satisfied:

$$L/fW < 1.0,$$

wherein $L$: the entire length of said second lens group along said optical axis, $fW$: the focal length of said whole zoom lens system in the wide angle end.

3. A zoom lens system with a function of reducing image vibration according to claim 2, wherein said second lens group is fixed in a direction of said optical axis when varying the focal length of said zoom lens system.

4. A zoom lens system with a function of reducing image vibration according to claim 2, wherein the following condition is satisfied:

$$0.1 < |f2|/(fW\cdot fT)^{1/2} < 1.0,$$

wherein $f2$: a focal length of the second lens group $G_2$, $fT$: the focal length of said whole zoom lens system in the telephoto end.

5. A zoom lens system according to claim 2, wherein the following condition is satisfied:

$$\Delta S_{max}/|f2| < 0.1,$$

wherein $f2$: a focal length of said second lens group, $\Delta S_{max}$: a maximum shift amount of said second lens group at the time of reducing image vibration.

6. A zoom lens system with a function of reducing image vibration according to claim 2, further comprising a fixed flare diaphragm.

7. A zoom lens system with a function of reducing image vibration according to claim 6, wherein said flare diaphragm is provided in a light path between said first and second lens groups.

8. A zoom lens system with, a function of reducing image vibration according to claim 2, wherein the following condition is satisfied:

$$-1.2 < r\_/f2 < -0.2,$$

wherein $r\_$: a radius of curvature of an image-side surface of a concave lens of said second lens group located closest to the object side, $f2$: a focal length of said second lens group.

9. A zoom lens system with a function of reducing image vibration according to claim 2, wherein when a shape factor of a concave lens of said second lens group located closest to the object side is $q_{21}$ and a refractive index of said concave lens is $n_{21}$, the following conditions are satisfied:

$$-3 < q_{21} < 0$$

$$1.6 < n_{21},$$

wherein when a radius of curvature of an object-side surface of said concave lens is $r_a$ and a radius of curvature of an image-side surface of said concave lens is $r_b$, said shape factor $q_{21}$ is given by:

$$q_{21}=(r_b+r_a)/(r_b-r_a).$$

10. A zoom lens system with a function of reducing image vibration comprising in the order from an object side:

a first lens group having a positive refracting power;

a second lens group being provided so as to be shiftable substantially along a direction perpendicular to an optical axis and having a negative refracting power; and a third lens group having a positive refracting power, a drive section for driving said second lens group, wherein said first and third lens groups are moved toward the object side on said optical axis at the time of varying a focal length of said zoom lens system from wide angle end to telephoto end, and said drive section drives said second lens group so as to satisfy the following condition:

$$\Delta Y=(1-\beta_2)\cdot\beta_3\cdot\Delta S,$$

wherein

ΔY: a shift amount of an image corresponding to movement of said second lens group, ΔS: a shift amount of said second lens group for reducing image vibration, $\beta_2$: an image magnification of said second lens group, $\beta_3$: an image magnification of said third lens group, and wherein when a shape factor of a concave lens of said second lens group located closest to the object side is $q_{21}$ and a refractive index of said concave lens is $n_{21}$, the following conditions are satisfied:

$$-3 < q_{21} < 0$$

$$1.6 < n_{21},$$

wherein when a radius of curvature of an object-side surface of said concave lens is $r_a$ and a radius of curvature of an image-side surface of said concave lens is $r_b$, said shape factor $q_{21}$ is given by:

$$q_{21} = (r_b + r_a)/(r_b - r_a).$$

11. A zoom lens system with a function of reducing image vibration comprising in the order from an object side:

a first lens group having a positive refracting power;

a second lens group having a negative refracting power; and a third lens group having a positive refracting power;

wherein said first and third lens groups are moved toward the object side on an optical axis at the time of varying a focal length of said zoom lens system from wide angle end to telephoto end and said second lens group is provided so as to be shiftable substantially along a direction perpendicular to the optical axis, wherein when the focal length of said whole zoom lens system in the wide angle end is fW, a shift amount of said second lens group in a direction of said optical axis at the time of varying the focal length of said zoom lens system is $\Delta L_2$, and a sign of said shift amount $\Delta L_2$, is plus at the time of shifting said second lens group toward the object side and minus at the time of shifting said second lens group toward an image side, the following condition is satisfied:

$$-0.2 < \Delta L_2/fW < 0.3,$$

and wherein the following condition is satisfied:

$$0.1 < |f2|/(fW \cdot fT)^{1/2} < 1.0,$$

wherein f2: a focal length of the second lens group $G_2$, fT: the focal length of said whole zoom lens system in the telephoto end.

12. A zoom lens system with a function of reducing image vibration according to claim 11, wherein a shift amount ΔY of an image corresponding to a shift amount of said second lens group satisfies the following condition:

$$\Delta Y = (1-\beta_2) \cdot \beta_3 \cdot \Delta S,$$

wherein

ΔS: a shift amount of said second lens group for reducing image vibration, $\beta_2$: an image magnification of said second lens group, $\beta_3$: an image magnification of said third lens group.

13. A zoom lens system with a function of reducing image vibration according to claim 11, wherein said second lens group is fixed with respect to a direction of said optical axis at the time of varying the focal length of said zoom lens system.

14. A zoom lens system with a function of reducing image vibration according to claim 11, wherein the following condition is satisfied:

$$L/fW < 1.0,$$

wherein

L: the entire length of said second lens group along said optical axis.

15. A zoom lens system with a function of reducing image vibration comprising in the order from an object side:

a first lens group having a positive refracting power;

a second lens group having a negative refracting power; and, a third lens group having a positive refracting power;

wherein said first and third lens groups are moved toward the object side on an optical axis at the time of varying a focal length of said zoom lens system from wide angle end to telephoto end and said second lens group is provided so as to be shiftable substantially along a direction perpendicular to the optical axis, wherein when the focal length of said whole zoom lens system in the wide angle end is fW, a shift amount of said second lens group in a direction of said optical axis at the time of varying the focal length of said zoom lens system is $\Delta L_2$, and a sign of said shift amount $\Delta L_2$, is plus at the time of shifting said second lens group toward the object side and minus at the time of shifting said second lens group toward an image side, the following condition is satisfied:

$$-0.2 < \Delta L_2/fW < 0.3,$$

and wherein the following condition is satisfied:

$$\Delta S_{max}/|f2| < 0.1$$

wherein f2: a focal length of said second lens group, $\Delta S_{max}$: a maximum shift amount of said second lens group at the time of reducing image vibration.

16. A zoom lens system with function of reducing image vibration according to claim 15, wherein a shift amount ΔY of an image corresponding to a shift amount of said second lens group satisfies the following condition:

$$\Delta Y = (1-\beta_2) \cdot \beta_3 \cdot \Delta S,$$

wherein

ΔS: a shift amount of said second lens group for reducing image vibration, $\beta_2$: an image magnification of said second lens group.

$\beta_3$: an image magnification of said third lens group.

17. A zoom lens system with a function of reducing image vibration according to claim 15, wherein said second lens group is fixed with respect to a direction of said optical axis at the time of varying the focal length of said zoom lens system.

18. A zoom lens system with a function of reducing image vibration according to claim 15, wherein the following condition is satisfied:

$$0.1 < |f2|/(fW \cdot fT)^{1/2} < 1.0,$$

wherein fT: the focal length of said whole zoom lens system in the telephoto end.

19. A zoom lens system with a function of reducing image vibration according to claim 15, further comprising a fixed flare diaphragm, wherein said flare diaphragm is provided in a light path between said first and second lens groups.

* * * * *

UNITED STATES PATENT AND TRADEMARK OFFICE
CERTIFICATE OF CORRECTION

PATENT NO. : 5,715,088
DATED : February 3, 1998
INVENTOR(S) : Kenzaburo SUZUKI

It is certified that error appears in the above-indentified patent and that said Letters Patent is hereby corrected as shown below:

<u>On the Title Page:</u>

In item [63]:

"June 2, 1995" should read --June 30, 1994--.

Signed and Sealed this

Thirtieth Day of June, 1998

*Attest:*

BRUCE LEHMAN

*Attesting Officer*    *Commissioner of Patents and Trademarks*